US012560482B2

(12) United States Patent
Sasayama et al.

(10) Patent No.: US 12,560,482 B2
(45) Date of Patent: Feb. 24, 2026

(54) MICROSCOPIC RAMAN SPECTROSCOPY DEVICE AND METHOD FOR ADJUSTING MICROSCOPIC RAMAN SPECTROSCOPY DEVICE

(71) Applicant: SHIMADZU CORPORATION, Kyoto (JP)

(72) Inventors: Tomoki Sasayama, Kyoto (JP); Yugo Ishihara, Kyoto (JP); Takeshi Maji, Kyoto (JP); Tomoyo Tao, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 445 days.

(21) Appl. No.: 18/011,019

(22) PCT Filed: Mar. 19, 2021

(86) PCT No.: PCT/JP2021/011373
§ 371 (c)(1),
(2) Date: Mar. 17, 2023

(87) PCT Pub. No.: WO2021/261035
PCT Pub. Date: Dec. 30, 2021

(65) Prior Publication Data
US 2023/0314219 A1    Oct. 5, 2023

(30) Foreign Application Priority Data

Jun. 24, 2020    (JP) .................................. 2020-108798

(51) Int. Cl.
G01N 21/65        (2006.01)
G01J 3/02        (2006.01)
G01J 3/44        (2006.01)

(52) U.S. Cl.
CPC ............. G01J 3/4412 (2013.01); G01J 3/021 (2013.01); G01J 3/0216 (2013.01);
(Continued)

(58) Field of Classification Search
CPC ........ G01J 3/4412; G01J 3/021; G01J 3/0216; G01J 3/0218; G01J 3/0229; G01J 3/0237;
(Continued)

(56) References Cited

U.S. PATENT DOCUMENTS

| | | | |
|---|---|---|---|
| 7,595,873 B1 | 9/2009 | Deck | |
| 2002/0105640 A1* | 8/2002 | Deck .................. | G02B 21/0076 356/301 |

(Continued)

FOREIGN PATENT DOCUMENTS

| | | | | |
|---|---|---|---|---|
| EP | 2333501 A1 * | 6/2011 | ................ | G01J 3/02 |
| JP | 7-92392 A | 4/1995 | | |

(Continued)

OTHER PUBLICATIONS

International Search Report for PCT/JP2021/011373 dated May 25, 2021.

(Continued)

*Primary Examiner* — Michelle M Iacoletti
*Assistant Examiner* — Judy Dao Tran
(74) *Attorney, Agent, or Firm* — Sughrue Mion, PLLC

(57)        ABSTRACT

Microscopic Raman spectroscopy device that detects and analyzes Raman scattering light emitted from sample irradiated with excitation light includes: laser light source that emits excitation light; spectrometer for measuring spectrum of the Raman scattering light; wavelength discriminator such as a dichroic filter that reflects the excitation light emitted from the laser light source toward the sample and transmits Raman scattering light emitted from the sample toward the spectrometer; condenser lens arranged between wavelength discriminator and the spectrometer for condensing the Raman scattering light passing through the wavelength discriminator; aperture arranged between the condenser lens and the spectrometer for limiting Raman (Continued)

scattering light incident on the spectrometer; adjusting means for adjusting to match a position of spot image of Raman scattering light condensed by condensing lens with a position of the aperture so that light amount of Raman scattering light passing through the aperture is maximized.

13 Claims, 5 Drawing Sheets

(52) U.S. Cl.
CPC ........... *G01J 3/0218* (2013.01); *G01J 3/0229* (2013.01); *G01J 3/0237* (2013.01); *G01J 3/0297* (2013.01); *G01N 21/65* (2013.01)

(58) Field of Classification Search
CPC .......... G01J 3/0297; G01J 3/44; G01N 21/65; G01N 2021/656
See application file for complete search history.

(56) References Cited

U.S. PATENT DOCUMENTS

| | | | | |
|---|---|---|---|---|
| 2013/0057856 | A1* | 3/2013 | Deguchi | G01J 3/0229 356/301 |
| 2015/0377701 | A1 | 12/2015 | Pawluczyk et al. | |

| | | | | |
|---|---|---|---|---|
| 2016/0363538 | A1* | 12/2016 | Dutertre | G02B 21/16 356/301 |
| 2018/0136040 | A1 | 5/2018 | Sodeoka et al. | |
| 2019/0204585 | A1* | 7/2019 | Coffin | G02B 7/182 359/199.1 |
| 2020/0292389 | A1 | 9/2020 | Yonetani et al. | |
| 2021/0381976 | A1 | 12/2021 | Ikehara | |

FOREIGN PATENT DOCUMENTS

| | | | | | |
|---|---|---|---|---|---|
| JP | H 0792392 | A | * | 4/1995 | ......... G02B 21/0076 |
| JP | 2010019630 | A | * | 1/2010 | .............. G01J 3/02 |
| JP | 2016-505148 | A | | 2/2016 | |
| JP | 2016-180733 | A | | 10/2016 | |
| JP | 2019-100927 | A | | 6/2019 | |
| JP | 2019-109180 | A | | 7/2019 | |
| WO | 2016/121946 | A1 | | 8/2016 | |
| WO | 2020/075548 | A1 | | 4/2020 | |

OTHER PUBLICATIONS

Japanese Office Action dated Aug. 1, 2023 in Japanese Application No. 2022-532305.
Office Action dated May 31, 2025 issued by China Patent Office in Application No. 202180045043.X.
Office Action dated Nov. 20, 2025 in Chinese Application No. 202180045043.X.

* cited by examiner (b)

(a)

MICROSCOPIC RAMAN SPECTROSCOPY DEVICE AND METHOD FOR ADJUSTING MICROSCOPIC RAMAN SPECTROSCOPY DEVICE

CROSS REFERENCE TO RELATED APPLICATIONS

This Application is a National Stage of International Application No. PCT/JP2021/011373 filed Mar. 19, 2021, claiming priority based on Japanese Patent Application No. 2020-108798 filed Jun. 24, 2020.

TECHNICAL FIELD

The present invention relates to Raman spectroscopy for measuring Raman scattering light from a subject, and more particularly to a microscopic Raman spectroscopy device using a microscope and a method for adjusting the microscopic Raman spectroscopy device.

RELATED ART

Conventionally, Raman spectroscopy has been used as a method for analyzing a composition, a chemical structure, a crystal structure and the like of a sample to be analyzed. The Raman spectroscopy is a method for obtaining a spectrum of Raman scattering light by analyzing scattered light obtained by irradiating a sample with laser light, and by analyzing a peak wavelength of this spectrum, the composition, chemical structure, crystal structure and the like of the sample can be analyzed. In particular, microscopic Raman spectroscopy, which uses a microscope as an optical system, makes it possible to extract information from minute regions in a sample, enabling measurement and analysis with high spatial resolution. Therefore, for example, a microscopic Raman spectroscopy device as described in Patent Document 1 has been put into practical use.

The microscopic Raman spectroscopy device described in Patent Document 1 includes a laser light source that emits laser light, a stage on which a sample is placed, an objective lens that collects a luminous flux of the laser light on the sample, a wavelength discriminator of light such as a dichroic filter that discriminates between the laser light and Raman scattering light, multiple mirrors, a spectroscopic section and the like, and the Raman scattering light emitted from the sample is guided to the spectroscopic section and a spectrum of the Raman scattering light is measured.

PRIOR ART DOCUMENT

Patent Document

Patent Document 1: JP-A 2019-109180

SUMMARY OF THE INVENTION

Problem to be Solved by the Invention

In order to perform highly accurate (that is, high S/N ratio (Signal/Noise ratio)) measurement in such a microscopic Raman spectroscopy device, excitation light (laser light) must be accurately incident on the sample and the Raman scattering light emitted from the sample must be accurately guided to the spectroscopic section. Therefore, an optical path of the excitation light and an optical path of the Raman scattering light are precisely adjusted.

However, even if the optical path of the excitation light and the optical path of the Raman scattering light are precisely adjusted once, a position of each optical system (laser light source, objective lens, mirror, wavelength discriminator of light such as a dichroic filter) may be displaced due to disturbance such as environmental temperature change and vibration. When such a positional deviation occurs, there is a problem that the optical path of the Raman scattering light is also displaced.

Then, when the optical path of the Raman scattering light is displaced, an amount of the Raman scattering light guided to the spectroscopic section is reduced and an output signal from the spectroscopic section is also reduced, resulting in a reduction in the S/N ratio of spectroscopic measurement.

The present invention has been made in view of such problems, and an object of the present invention is to provide a microscopic Raman spectroscopy device capable of performing measurement with a high S/N ratio even when an optical path of Raman scattering light is displaced due to disturbance or the like and a method for adjusting the microscopic Raman spectroscopy device.

Means for Solving the Problem

A first aspect of the present invention relates to a microscopic Raman spectroscopy device that detects and analyzes Raman scattering light emitted from a sample irradiated with excitation light, the microscopic Raman spectroscopy device including: a laser light source that emits the excitation light; a spectrometer for measuring a spectrum of the Raman scattering light; a wavelength discriminator of light such as a dichroic filter that reflects the excitation light emitted from the laser light source toward the sample and transmits the Raman scattering light emitted from the sample toward the spectrometer; a condenser lens arranged between the wavelength discriminator of light and the spectrometer for condensing the Raman scattering light passing through the wavelength discriminator of light; an aperture arranged between the condenser lens and the spectrometer for limiting the Raman scattering light incident on the spectrometer; and an adjusting means for adjusting to match a position of a spot image of the Raman scattering light condensed by the condensing lens with a position of the aperture so that a light intensity of the Raman scattering light passing through the aperture is maximized.

A second aspect of the present invention relates to a method for adjusting a microscopic Raman spectroscopy device including: a laser light source that emits excitation light; a spectrometer for measuring a spectrum of Raman scattering light; a wavelength discriminator of light such as a dichroic filter that reflects the excitation light emitted from the laser light source toward the sample and transmits the Raman scattering light emitted from the sample toward the spectrometer; a condenser lens arranged between the wavelength discriminator of light and the spectrometer for condensing the Raman scattering light passing through the wavelength discriminator of light; and an aperture arranged between the condenser lens and the spectrometer for limiting the Raman scattering light incident on the spectrometer, the method including a step for adjusting to match a position of a spot image of the Raman scattering light condensed by the condensing lens with a position of the aperture so that a light amount of the Raman scattering light passing through the aperture is maximized.

Effects of the Invention

According to the microscopic Raman spectroscopy device of the present invention, even when an optical path of the Raman scattering light is displaced due to disturbance or the like, relative positional relationship between the optical path of the Raman scattering light and the aperture is adjusted, so that the Raman scattering light incident on the spectrometer does not decrease and measurements with high S/N ratio can be made. Similarly, according to the method of adjusting the microscopic Raman spectroscopy device of the present invention, even when the optical path of the Raman scattering light is displaced due to disturbance or the like, measurements with high S/N ratio can be made.

MODE FOR CARRYING OUT THE INVENTION

Hereinafter, detailed description will be made on a microscopic Raman spectroscopy device and a method for adjusting a microscopic Raman spectroscopy device of the present invention based on a preferred embodiment described in the accompanying drawings.

First Embodiment

Figure 1:
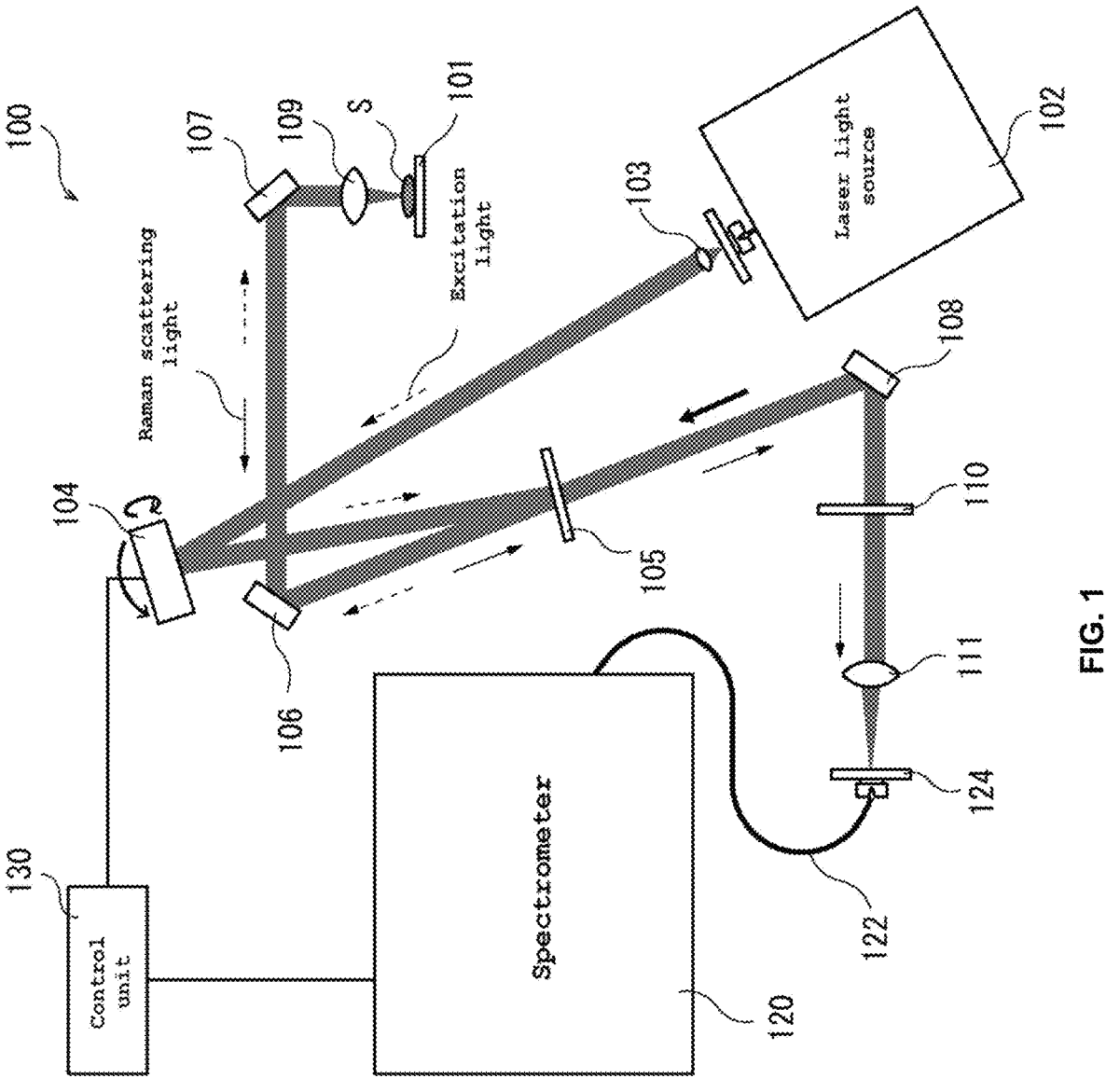
FIG. 1 is a block diagram of a microscopic Raman spectroscopy device according to a first embodiment of the present invention.

FIG. 1 is a block diagram of a microscopic Raman spectroscopy device 100 according to the first embodiment of the present invention. As shown in FIG. 1, a microscopic Raman spectroscopy device 100 of this embodiment includes a stage 101 on which a sample S is placed, a laser light source 102, a collimator lens 103, a movable mirror 104, and a first filter 105, mirrors 106, 107, 108, an objective lens 109, a second filter 110, an imaging lens 111, a spectrometer 120, an optical fiber 122, an aperture member 124, a control unit 130, and the like. In FIG. 1, thick grey lines indicate an optical path of excitation light emitted from the laser light source 102 (indicated by the dashed arrow in FIG. 1) and an optical path of Raman scattering light emitted from the sample S (indicated by the solid arrow in FIG. 1). In this regard, the microscopic Raman spectroscopy device 100 of this embodiment has an optical path adjustment function so that calibration can be performed prior to actual measurement, and when performing calibration, a reference sample that emits the Raman scattering light of a specific wavelength is used as the sample S (details will be described later).

The stage 101 is a support base for fixedly supporting the sample S, and the sample S is placed on the stage 101 while being sandwiched between a cover glass and a slide glass (not shown).

The laser light source 102 is a device that emits single-wavelength excitation light. The excitation light emitted from the laser light source 102 is formed into parallel light by the collimator lens 103 and is incident on a substantially central portion of a mirror portion 104e (FIG. 2) of the movable mirror 104.

Figure 2:
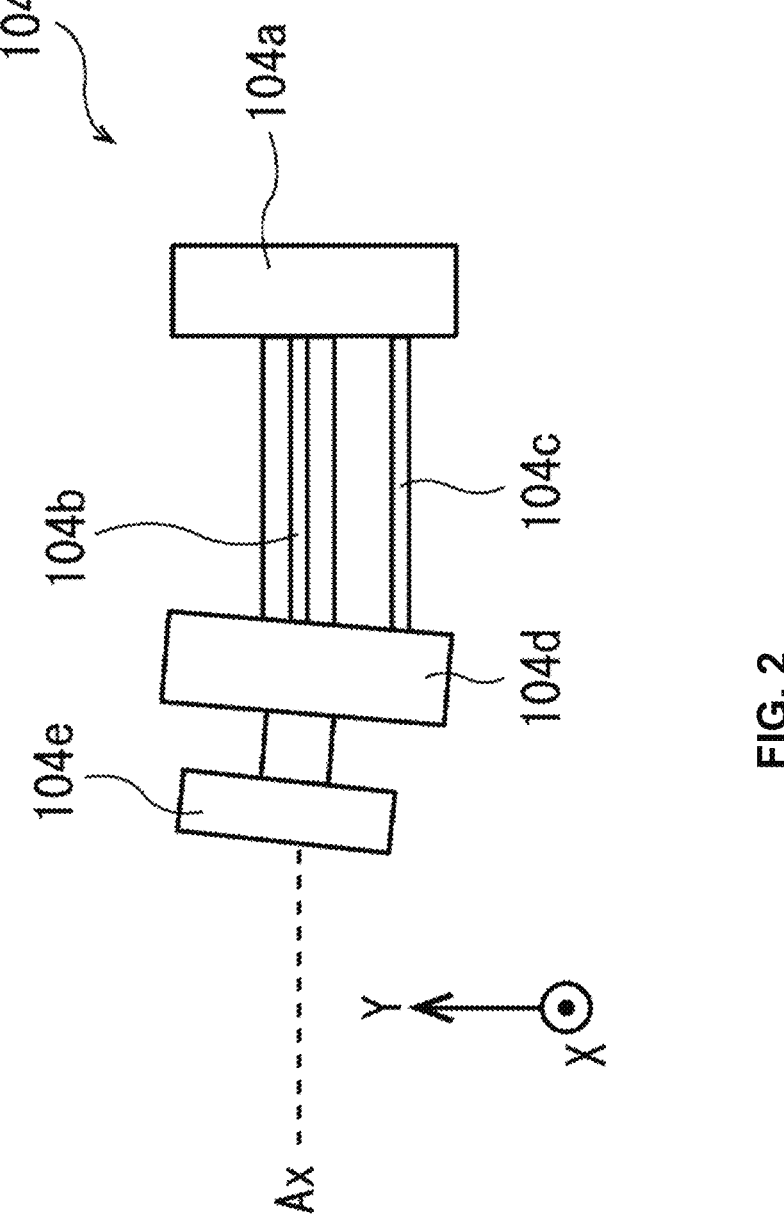
FIG. 2 is a diagram illustrating a schematic configuration of a movable mirror of a microscopic Raman spectroscopy device according to the first embodiment of the present invention.

FIG. 2 is a diagram illustrating a schematic configuration of the movable mirror 104 of this embodiment. The movable mirror 104 is a member that reflects the excitation light incident from the laser light source 102 toward the first filter 105. As shown in FIG. 2, the movable mirror 104 includes a fixed portion 104a, piezo elements 104b and 104c, a movable portion 104d, the mirror portion 104e fixed to the movable portion 104d and the like.

The fixed portion 104a is a member fixed at a predetermined position in the microscopic Raman spectroscopy device 100 and is connected to one end portions of the piezo elements 104b and 104c.

The piezo elements 104b and 104c are electrically connected to the control unit 130 via terminals (not shown) and are elements that are deformed (expanded and contracted) by voltage input from the control unit 130. The other end portions of the piezo elements 104b and 104c are fixed to the movable portion 104d. When the piezo element 104b is deformed, the mirror portion 104e fixed to the movable portion 104d rotates in a X direction around an optical axis AX, and when the piezo element 104c is deformed, the mirror portion 104e fixed to the movable portion 104d rotates in a Y direction orthogonal to the X direction. As described above, since the excitation light is incident on the substantially central portion of the mirror portion 104e, a reflection direction of the excitation light is changed by rotating the mirror portion 104e in the X direction and the Y direction. In other words, the movable mirror 104 of this embodiment can change an angle of the mirror portion 104e by adjusting the voltages input from the control unit 130 to the piezo elements 104b and 104c. This makes it possible to reflect the excitation light incident on the mirror portion 104e in a desired direction. The excitation light reflected by the mirror section 104e enters the first filter 105 (FIG. 1).

The first filter 105 (wavelength discriminator of light such as a dichroic filter) is an LPF (long pass filter) that reflects the excitation light from the movable mirror 104 and selectively transmits the Raman scattering light from the sample S. As shown in FIG. 1, the excitation light reflected by the first filter 105 is reflected by the mirrors 106 and 107, condensed into a spot by the objective lens 109, and irradiated onto the sample S on the stage 101.

When the sample S is irradiated with the excitation light, light is emitted from the excitation light spot (that is, the position where the excitation light is condensed). The emitted light includes light scattered and reflected by the sample S, including the Raman scattering light used in the microscopic Raman spectroscopy device 100 of the present invention. The emitted light including the Raman scattering light enters the first filter 105 via the objective lens 109 and mirrors 107 and 106.

As described above, since the first filter 105 is a filter having the property of selectively passing the Raman scattering light, a transmitted light that passes through the first filter 105 is only the Raman scattering light, and other components (other scattered light and reflected light from sample S) are removed by the first filter 105. The Raman scattering light passing through the first filter 105 is reflected by the mirror 108 and enters the second filter 110.

The second filter 110 is an LPF (long pass filter) for improving wavelength characteristics. The Raman scattering light passing through the second filter 110 is condensed by the imaging lens 111 and enters the aperture member 124.

The aperture member 124 is a member that has a substantially circular aperture (aperture) 124a into which the Raman scattering light from the imaging lens 111 is incident and that supports one end portion of the optical fiber 122 connected to the spectrometer 120. The aperture 124a of this embodiment is arranged at a position conjugated with the sample S and is configured to have a shape and size that are substantially the same as a spot image formed on the aperture 124a. Then, the Raman scattering light that has passed through the aperture 124a is guided to the spectrometer 120 by the optical fiber 122.

That is, when the position of the spot image formed by the imaging lens 111 and the position of the aperture 124a exactly match, optical information of a measurement area within the sample S is introduced into the spectrometer 120 via the aperture 124a and the optical fiber 122 in just the right amount.

Note that the aperture 124a of the present embodiment is described as being substantially circular (pinhole) but any shape of the aperture can be applied as long as the incident Raman scattering light can be regulated and shaped into a spot of predetermined shape and size.

The spectrometer 120 has, for example, a diffraction grating, and disperses the Raman scattering light incident through the optical fiber 122 to obtain spectral data specific to the sample S (that is, the measurement area within the sample S). The spectral data obtained by spectrometer 120 is transmitted to the control unit 130.

The control unit 130 is a device that collects the spectral data received from the spectrometer 120 and analyzes the composition, chemical structure, crystal structure and the like of the sample S, and can be configured by, for example, a commercially available PC (Personal Computer).

Further, as described above, the control unit 130 of this embodiment is electrically connected to the piezo elements 104b and 104c of the movable mirror 104, and it is possible to change the angle of the mirror section 104e by deforming (expanding and contracting) the piezo elements 104b and 104c by the voltage output from the control unit 130. When the angle of the mirror portion 104e is changed, the direction of the excitation light reflected by the mirror portion 104e is changed, so the direction of the excitation light incident on the first filter 105 is changed.

Then, when the direction of the excitation light incident on the first filter 105 is changed, the angle of the excitation light reflected by the first filter 105 (that is, the excitation light directed toward the sample S) is changed. As a result, a spot position of the excitation light irradiated on the sample S is changed, so that the position of the Raman scattering light emitted from the sample S is also changed.

Then, when the position of the Raman scattering light emitted from the sample S is changed, the direction of the Raman scattering light incident on the first filter 105 is changed, the direction of the Raman scattering light passing through the mirror 108, the second filter 110 and the imaging lens 111 is also changed, and the spot position condensed on the aperture member 124 is also changed.

As described above, in this embodiment, the spot position of the Raman scattering light condensed on the aperture member 124 is configured to be capable of changing by the control unit 130, and adjustment (calibration) is performed so that the Raman scattering light incident on the spectrometer 120 does not decrease even if for example, positional and angular deviations of the optical systems (laser light source 102, objective lens 109, mirrors 106, 107, 108, first filter 105, second filter 110) occur due to disturbances such as environmental temperature changes and vibrations.

(Method for Adjusting Microscopic Raman Spectroscopy Device 100 (Calibration Process))

Figure 3:
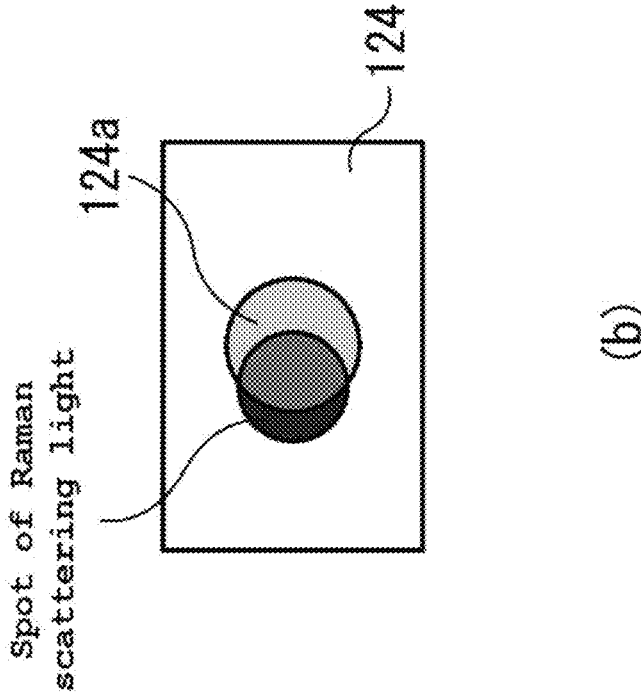
FIG. 3 is a diagram showing relationship between a position of an aperture of the microscopic Raman spectroscopy device according to the first embodiment of the present invention and a spot position of Raman scattering light condensed on the aperture.
Figure 3:
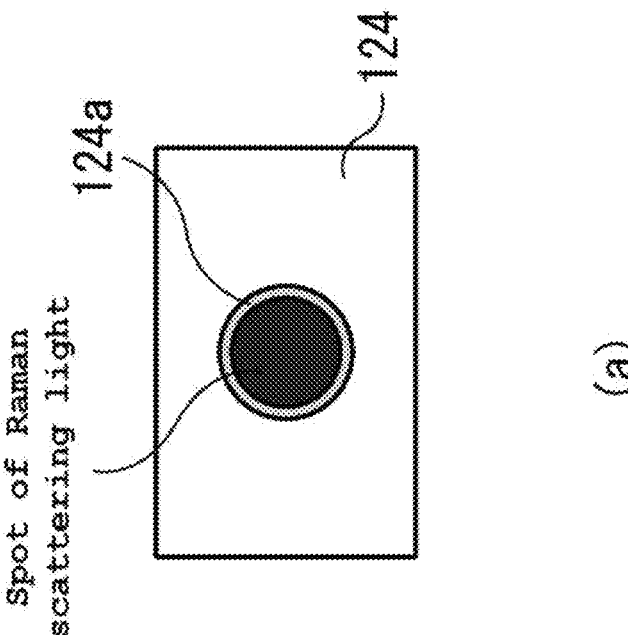

FIG. 3 is a diagram showing relationship between the position of the aperture member 124 (aperture 124a) and the spot position of the Raman scattering light condensed on the aperture member 124. When each optical system (laser light source 102, objective lens 109, mirrors 106, 107, 108, first filter 105, second filter 110) is adjusted to an ideal position, the spot position of the Raman scattering light condensed on the aperture member 124 substantially coincides with the position of the aperture 124a of the aperture member 124 (FIG. 3 at (a)).

However, even if the position of each optical system is once adjusted accurately, the influence of external disturbances such as environmental temperature changes and vibrations may cause the positional and angular deviations in each optical system. Then, when such a positional or an angular deviation occurs, the optical path of the Raman scattering light is displaced, so that a relative positional relationship between the optical path of the Raman scattering light (that is, the spot position) and the aperture 124a of the aperture member 124 is shifted (FIG. 3 at (b)).

If the relative positional relationship between the optical path of the Raman scattering light (that is, the spot position) and the aperture 124a of the aperture member 124 deviates in this way, the amount of the Raman scattering light entering the aperture 124a decreases, and as a result, the Raman scattering light incident on the spectrometer 120 is reduced.

Therefore, in this embodiment, before starting measurement, a reference sample that emits the Raman scattering light of a specific wavelength is used as the sample S, and a calibration process is performed to adjust the relative positional relationship between the optical path of the Raman scattering light (that is, the spot position) and the aperture 124a of the aperture member 124 so that a light amount of the Raman scattering light passing through the aperture 124a is maximized (that is, the state shown in FIG. 3 at (a)).

Specifically, when the sample S (reference sample) is placed on the stage 101 and the calibration process is performed via a user interface (not shown) before starting the measurement by the microscopic Raman spectroscopy device 100, the control unit 130 monitors an output of the spectrometer 120 and changes the voltages applied to the piezo elements 104b and 104c so that the output of the spectrometer 120 is maximized. Then, when the calibration process is finished, it is configured such that the measurement (that is, acquisition of spectral data) by the microscopic Raman spectroscopy device 100 can be started in a state where the output of the spectrometer 120 is maximized (that is, the state shown in FIG. 3 at (a)).

As described above, according to the configuration of the present embodiment, before starting measurement by the microscopic Raman spectroscopy device 100, the relative positional relationship between the optical path of the Raman scattering light (that is, the spot position) and the aperture 124a of the aperture member 124 is adjusted so that the light amount of the Raman scattering light passing through the aperture 124a is maximized (that is, the state shown in FIG. 3 at (a)). Therefore, even if the positional deviation or the angular deviation of each optical system occurs due to the influence of external disturbances such as environmental temperature changes or vibrations, the Raman scattering light incident on the spectrometer 120 does not decrease.

Therefore, it is possible to always measure with a high S/N ratio.

Although the present embodiment has been described above, the present invention is not limited to the above configuration, and various modifications are possible within the scope of the technical idea of the present invention.

For example, in the present embodiment, the optical path of the excitation light is moved (changed) by changing the angle of the mirror portion 104*e* of the movable mirror 104, but the configuration is not necessarily limited to this. The optical path of at least one of the excitation light and the Raman scattering light may be moved. Further, as a configuration for moving the optical path of the Raman scattering light, for example, a configuration including a moving means that supports the imaging lens 111 and moves the imaging lens 111 in a direction orthogonal to the optical path of the Raman scattering light can be adopted. Furthermore, it is also possible to adopt a configuration including a moving means for supporting the aperture member 124 and moving the aperture member 124 in a direction orthogonal to the optical path of the Raman scattering light.

Further, although the mirror portion 104*e* of the movable mirror 104 of this embodiment is rotated by the piezo elements 104*b* and 104*c*, it is sufficient if the angle of the mirror portion 104*e* can be changed, and for example, a pulse motor with a deceleration mechanism can be used.

Further, in the present embodiment, the aperture member 124 having the aperture 124*a* is provided, but the aperture member 124 is not necessarily required because the core of the optical fiber 122 functions as a kind of aperture.

Further, in the calibration process (method for adjusting) of the present embodiment, the reference sample that emits the Raman scattering light of a specific wavelength is used as the sample S, but for example, if the wavelength of the Raman scattering light of the sample S used for actual measurement is known in advance, the sample S used for the actual measurement can be used instead of the reference sample.

In addition, by configuring the stage 101 so that the sample S to be used for the actual measurement and the reference sample can be placed, the reference sample and the sample S used for the actual measurement may be switched between the calibration process and the actual measurement.

Second Embodiment

Figure 4:
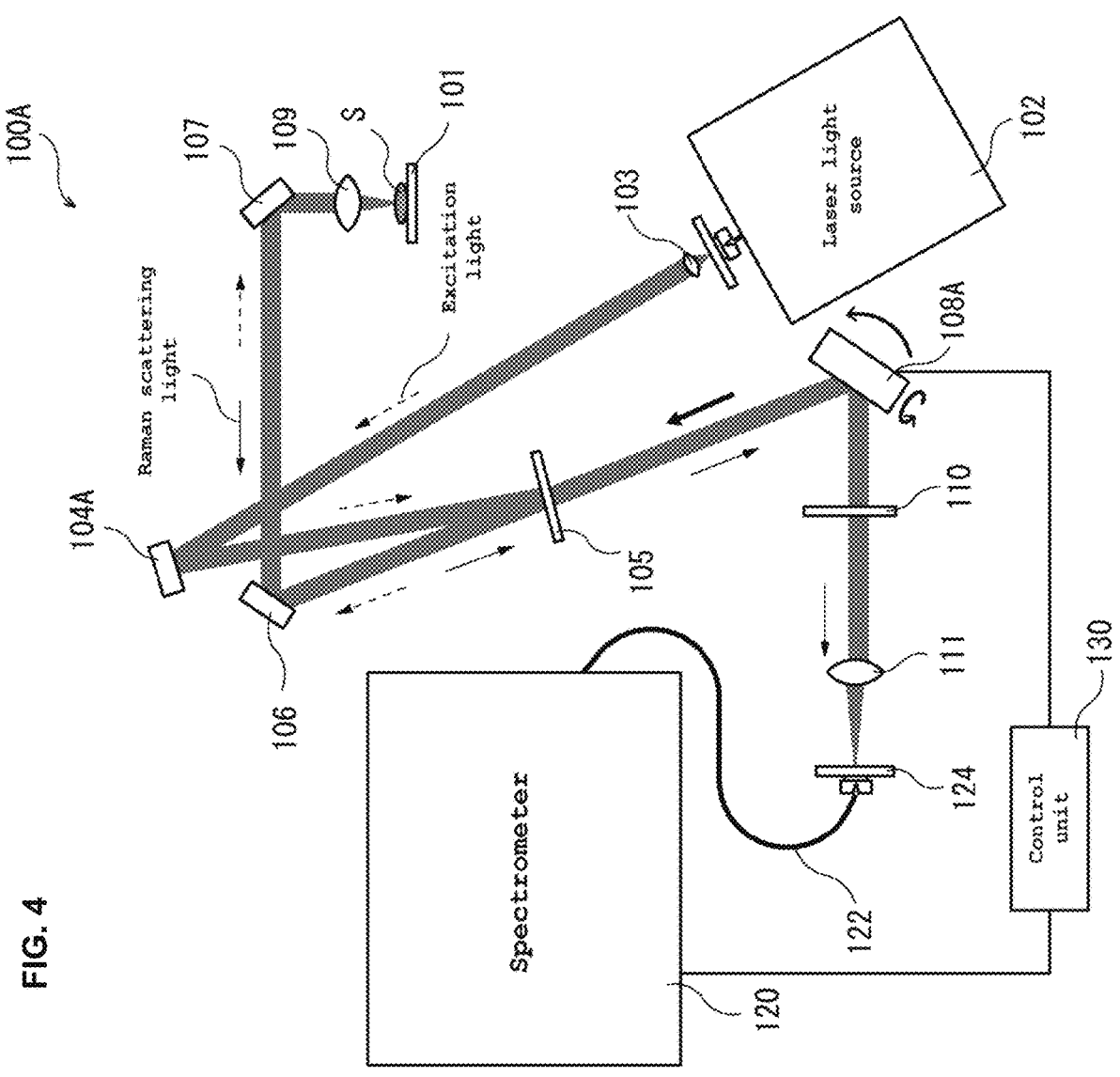
FIG. 4 is a block diagram of a microscopic Raman spectroscopy device according to a second embodiment of the present invention.

FIG. 4 is a block diagram of a microscopic Raman spectroscopy device 100A according to the second embodiment of the present invention. As shown in FIG. 4, the microscopic Raman spectroscopy device 100A of the present embodiment differs from the microscopic Raman spectroscopy device 100 of the first embodiment in that a mirror 104A is fixed and a movable mirror 108A is movable. In this regard, the configuration of the movable mirror 108A of this embodiment is the same as the configuration of the movable mirror 104 of the first embodiment.

By rotating the movable mirror 108A, it is possible to move the optical path of the Raman scattering light from the movable mirror 108A to the spectrometer 120. Therefore, as in the first embodiment, the relative positional relationship between the optical path of the Raman scattering light (that is, the spot position) and the aperture 124*a* of the aperture member 124 can be adjusted.

Third Embodiment

Figure 5:
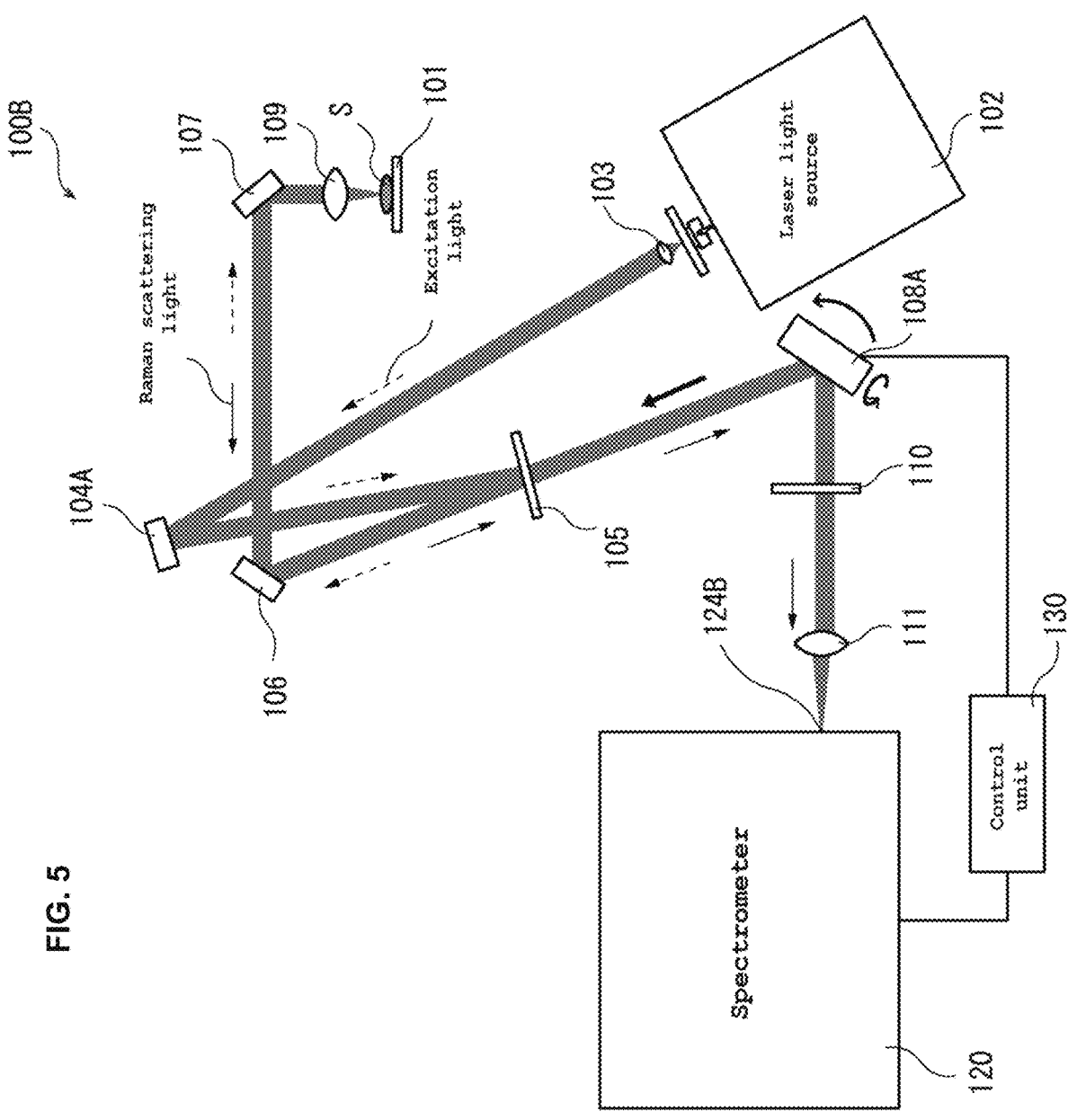
FIG. 5 is a block diagram of a microscopic Raman spectroscopy device according to a third embodiment of the present invention.

FIG. 5 is a block diagram of a microscopic Raman spectroscopy device 100B according to the third embodiment of the present invention. As shown in FIG. 5, the microscopic Raman spectroscopy device 100B of the present embodiment differs from the microscopic Raman spectroscopy device 100A of the second embodiment in that the aperture 124*a* is formed at an incident port of the spectrometer 120 (that is, the incident port of the spectrometer 120 also serves as the aperture 124*a*).

According to the configuration of this embodiment, special members for guiding the Raman scattering light to the spectrometer 120, such as the aperture member 124 and the optical fiber 122, are not required.

[Aspect]

It will be understood by those skilled in the art that the multiple exemplary embodiments described above are specific examples of the following aspects.

[1] A microscopic Raman spectroscopy device (100, 100A) according to one aspect is the microscopic Raman spectroscopy device (100, 100A) that detects and analyzes Raman scattering light emitted from a sample (S) irradiated with excitation light, the microscopic Raman spectroscopy device (100, 100A) including:

a laser light source (102) that emits the excitation light;

a spectrometer (120) for measuring a spectrum of the Raman scattering light;

a wavelength discriminator of light (105) that reflects the excitation light emitted from the laser light source (102) toward the sample (S) and transmits the Raman scattering light emitted from the sample (S) toward the spectrometer (120);

a condenser lens (111) arranged between the wavelength discriminator of light (105) and the spectrometer (120) for condensing the Raman scattering light passing through the wavelength discriminator of light (105);

an aperture (124*a*) arranged between the condenser lens (111) and the spectrometer (120) for limiting the Raman scattering light incident on the spectrometer (120); and an adjusting means (104, 130) for adjusting to match a position of a spot image of the Raman scattering light condensed by the condensing lens (111) with a position of the aperture (124*a*) so that a light amount of the Raman scattering light passing through the aperture (124*a*) is maximized.

According to the microscopic Raman spectroscopy device according to the item [1], even if an optical path of the Raman scattering light is displaced due to disturbance or the like, the position of the spot image of the Raman scattering light and the position of the aperture are adjusted to match. Therefore, the Raman scattering light incident on the spectrometer does not decrease, and measurement with a high S/N ratio can be performed.

[2] In the microscopic Raman spectroscopy device (100, 100A) according to the item [1], the adjusting means (104, 130) is arranged in an optical path of the excitation light from the laser light source (102) to the wavelength discriminator of light (105) and configured to have a first mirror portion (104) for changing a position of the optical path of the Raman scattering light from the wavelength discriminator of light (105) to the spectrometer (120).

According to the microscopic Raman spectroscopy device according to the item [2], the position of the optical path of the Raman scattering light can be easily changed by changing the angle of the first mirror portion.

[3] In the microscopic Raman spectroscopy device (100, 100A) according to the item [1] or [2], the adjusting means (104, 130) is arranged in the optical path of the Raman scattering light from the wavelength discriminator of light (105) to the spectrometer (120) and configured to have a second mirror portion (108A) that changes the position of the optical path of the Raman scattering light from the wavelength discriminator of light (105) to the spectrometer (120).

According to the microscopic Raman spectroscopy device according to the item [3], the position of the optical path of the Raman scattering light can be easily changed by changing the angle of the second mirror portion.

[4] In the microscopic Raman spectroscopy device (100, 100A) according to any one of the items [1] to [3], the adjusting means (104, 130) is configured to have a first moving means for moving the aperture (124a) in a direction orthogonal to the optical path of the Raman scattering light.

According to the microscopic Raman spectroscopy device according to the item [4], by moving the first moving means, the relative position of the optical path of the Raman scattering light can be easily changed.

[5] In the microscopic Raman spectroscopy device (100, 100A) according to any one of the items [1] to [4], the adjusting means (104, 130) is configured to have a second moving means for moving the condenser lens (111) in a direction orthogonal to the optical path of the Raman scattering light.

According to the microscopic Raman spectroscopy device according to the item [5], by moving the second moving means, the relative position of the optical path of the Raman scattering light can be easily changed.

[6] In the microscopic Raman spectroscopy device (100, 100A) according to any one of the items [1] to [5], an optical fiber (122) is provided for guiding the Raman scattering light that has passed through the aperture (124a) to the spectrometer (120).

According to the microscopic Raman spectroscopy device according to the item [5], the Raman scattering light that has passed through the aperture can be easily guided to the spectrometer.

[7] In the microscopic Raman spectroscopy device (100, 100A) according to the item [6], the aperture (124a) is formed on an incident surface of the optical fiber.

According to the microscopic Raman spectroscopy device according to the item [7], the Raman scattering light can be limited without adding a special member.

[8] In the microscopic Raman spectroscopy device (100, 100A) according to any one of the items [1] to [5], the aperture (124a) is formed at an incident port of the spectrometer (120).

According to the microscopic Raman spectroscopy device according to the item [8], the Raman scattering light can be limited without adding a special member.

[9] In the microscopic Raman spectroscopy device (100, 100A) according to any one of the items [1] to [8], the sample (S) is a reference sample that emits the Raman scattering light of a specific wavelength.

According to the microscopic Raman spectroscopy device according to the item [9], since the Raman scattering light with a predetermined intensity can be obtained, accurate calibration can be performed.

[10] In the microscopic Raman spectroscopy device (100, 100A) according to any one of the items [1] to [9], The microscopic Raman spectroscopy device (100, 100A) further comprising:

a light amount acquisition means (130) for acquiring the light amount of the Raman scattering light incident on the spectrometer (120);

a driving means (104b, 104c) for driving the adjusting means (104, 130); and a control means (130) for driving the driving means (104b, 104c) based on the light amount acquired by the light amount acquisition means (130).

According to the microscopic Raman spectroscopy device according to the item [10], the position of the spot image of the Raman scattering light and the position of the aperture can be adjusted automatically.

[11] A method for adjusting a microscopic Raman spectroscopy device (100, 100A) according to one aspect is the method for adjusting the microscopic Raman spectroscopy device (100, 100A) including: a laser light source (102) that emits the excitation light; a spectrometer (120) for measuring a spectrum of Raman scattering light emitted from a sample (S) irradiated with the excitation light; a wavelength discriminator of light (105) that reflects the excitation light emitted from the laser light source (102) toward the sample (S) and transmits the Raman scattering light emitted from the sample (S) toward the spectrometer (120); a condenser lens (111) arranged between the wavelength discriminator of light (105) and the spectrometer (120) for condensing the Raman scattering light passing through the wavelength discriminator of light (105); and an aperture (124a) arranged between the condenser lens (111) and the spectrometer (120) for limiting the Raman scattering light incident on the spectrometer (120), the method including a step for adjusting to match a position of a spot image of the Raman scattering light condensed by the condensing lens (111) with a position of the aperture (124a) so that a light amount of the Raman scattering light passing through the aperture (124a) is maximized.

According to the method for adjusting the microscopic Raman spectroscopy device according to the item [11], even if an optical path of the Raman scattering light is displaced due to disturbance or the like, the position of the spot image of the Raman scattering light and the position of the aperture are adjusted to match. Therefore, the Raman scattering light incident on the spectrometer does not decrease, and measurement with a high S/N ratio can be performed.

DESCRIPTION OF REFERENCES

100: Microscopic Raman spectroscopy device
100A: Microscopic Raman spectroscopy device
101: Stage
102: Laser light source
103: Collimator lens
104: Movable mirror
104A: Mirror
104a: Fixed portion
104b: Piezo element
104c: Piezo element
104d: Movable portion
104e: Mirror portion
105: First filter
106: Mirror 107: Mirror
108: Mirror
108A: Movable mirror
109: Objective lens
110: Second filter
111: Imaging lens
120: Spectrometer
122: Optical fiber
124: Aperture member
124a: Aperture
130: Control unit
S: Sample

What is claimed is:

1. A microscopic Raman spectroscopy device that detects and analyzes Raman scattering light emitted from a sample irradiated with excitation light, the microscopic Raman spectroscopy device comprising:

a laser light source that emits the excitation light;
a spectrometer for measuring a spectrum of the Raman scattering light;
a wavelength discriminator of light that reflects the excitation light emitted from the laser light source toward the sample and transmits the Raman scattering light emitted from the sample toward the spectrometer;
a condenser lens arranged between the wavelength discriminator of light and the spectrometer for condensing the Raman scattering light passing through the wavelength discriminator of light;
an aperture arranged between the condenser lens and the spectrometer for limiting the Raman scattering light incident on the spectrometer;
at least one movable mirror configured to adjust and match a position of a spot image of the Raman scattering light condensed by the condensing lens with a position of the aperture so that a light amount of the Raman scattering light passing through the aperture is maximized.

2. The microscopic Raman spectroscopy device as claimed in claim 1, wherein the at least one movable mirror is arranged in an optical path of the excitation light from the laser light source to the wavelength discriminator of light and configured to have a first mirror portion for changing a position of the optical path of the Raman scattering light from the wavelength discriminator of light to the spectrometer.

3. The microscopic Raman spectroscopy device as claimed in claim 1, wherein the at least one movable mirror is arranged in an optical path of the Raman scattering light from the wavelength discriminator of light to the spectrometer and configured to have a second mirror portion that changes the position of the optical path of the Raman scattering light from the wavelength discriminator of light to the spectrometer.

4. The microscopic Raman spectroscopy device as claimed in claim 1, wherein the aperture is configured to be moved in a direction orthogonal to an optical path of the Raman scattering light.

5. The microscopic Raman spectroscopy device as claimed in claim 1, wherein the condenser lens is configured to be moved in a direction orthogonal to an optical path of the Raman scattering light.

6. The microscopic Raman spectroscopy device as claimed in claim 1, further comprising:

an optical fiber that guides the Raman scattering light that has passed through the aperture to the spectrometer.

7. The microscopic Raman spectroscopy device as claimed in claim 6, wherein the aperture is formed on an incident surface of the optical fiber.

8. The microscopic Raman spectroscopy device as claimed in claim 1, wherein the aperture is formed at an incident port of the spectrometer.

9. The microscopic Raman spectroscopy device as claimed in claim 1, wherein the sample is a reference sample that emits the Raman scattering light of a specific wavelength.

10. The microscopic Raman spectroscopy device as claimed in claim 1, further comprising:

at least one piezo element configured to drive or adjust the at least one movable mirror,
a controller configured to:

acquire the light amount of the Raman scattering light incident on the spectrometer; and drive at least one piezo element based on the light amount acquired by the controller.

11. The microscopic Raman spectroscopy device as claimed in claim 10, wherein the at least one piezo element comprises a first piezo element and a second piezo element, wherein the first piezo element is configured to deform in response to a first voltage from the controller to rotate the mirror portion in an X direction around an optical axis, and wherein the second piezo element is configured to deform in response to a second voltage from the controller to rotate the mirror portion in a Y direction orthogonal to the X direction around the optical axis.

12. The microscopic Raman spectroscopy device as claimed in claim 10, wherein the at least one movable mirror comprises a fixed portion, a movable portion, and a mirror portion fixed to the movable portion, wherein the at least one piezo element is connected between the fixed portion and the movable portion.

13. The microscopic Raman spectroscopy device as claimed in claim 1, further comprising:

a controller configured to perform calibration before starting measurement by monitoring an output of the spectrometer and adjusting applied voltages to maximize the output of the spectrometer.

* * * * *